(12) United States Patent
Ito et al.

(10) Patent No.: US 10,133,899 B2
(45) Date of Patent: Nov. 20, 2018

(54) BAGGAGE MANAGEMENT SYSTEM

(71) Applicant: TOSHIBA TEC KABUSHIKI KAISHA, Tokyo (JP)

(72) Inventors: Kenji Ito, Ota Tokyo (JP); Masami Yamanashi, Izunokuni Shizuoka (JP); Shinichi Kashiwagi, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/246,584

(22) Filed: Aug. 25, 2016

(65) Prior Publication Data
US 2017/0091501 A1     Mar. 30, 2017

(30) Foreign Application Priority Data

Sep. 28, 2015  (JP) ................................. 2015-189517

(51) Int. Cl.
G06Q 10/08     (2012.01)
G06K 7/10      (2006.01)
G06F 17/30     (2006.01)

(52) U.S. Cl.
CPC ..... *G06K 7/10861* (2013.01); *G06F 17/3082* (2013.01); *G06Q 10/08* (2013.01)

(58) Field of Classification Search
None
See application file for complete search history.

(56) References Cited

U.S. PATENT DOCUMENTS 7,243,845 B2    7/2007  Cash
7,561,717 B2 *  7/2009  Anderson .......... G06K 17/0022
                                                  235/462.13

(Continued)

FOREIGN PATENT DOCUMENTS

EP      2168873 A2      3/2010
JP    2006-174200       6/2006

(Continued)

OTHER PUBLICATIONS

Senem Velipasalar et al, "Detection of 1-15 user-defined, semantically high-level, composite events, and retrieval of event queries", Multimedia Tools and Applications, Kluwer Academic Publishers, BO, vol. 50, No. 1, Mar. 6, 2010, pp. 249-278, XP019826316, ISSN: 1573-7721.

(Continued)

*Primary Examiner* — Christle I Marshall
(74) *Attorney, Agent, or Firm* — Patterson & Sheridan, LLP (57) ABSTRACT

A baggage management system according to an embodiment includes a storage unit and a processor. The storage unit stores a baggage terminal identification corresponding to a baggage terminal which is provided with a baggage that is a subject of a baggage management event. The storage unit also stores a clock time of the baggage management event, the clock time being stored in association with the baggage terminal identification. The processor receives a search condition corresponding to the baggage terminal identification. The processor identifies the clock time stored in the storage unit in association with the baggage terminal identification that corresponds to the search condition. The processor identifies a video file of a video recording recorded at the identified clock time. A display unit displays the identified video file.

12 Claims, 7 Drawing Sheets

300

| EVENT NUMBER | CUSTOMER TERMINAL ID | BAGGAGE TERMINAL ID | EVENT DATE AND TIME | VIDEO TIME | EVENT TYPE | PERSON IN CHARGE |
|---|---|---|---|---|---|---|
| 101 | C099 | D156 | YYYMMDDhhmm | hhmm | KEEPING | ○○ |
| 102 | C123 | D058 | YYYMMDDhhmm | hhmm | KEEPING | ○○ |
| 103 | C025 | D333 | YYYMMDDhhmm | hhmm | RETURNING | △△ |
| 104 | C087 | D027 | YYYMMDDhhmm | hhmm | RETURNING | ×× |
| 105 | C001 | D014 | YYYMMDDhhmm | hhmm | KEEPING | ×× |
| . | . | . | . | . | . | . |
| . | . | . | . | . | . | . |
| . | . | . | . | . | . | . |

(56) References Cited

U.S. PATENT DOCUMENTS

| | | | | |
|---|---|---|---|---|
| 7,926,705 B2* | 4/2011 | Hills | ............... | G06Q 50/30 |
| | | | | 235/375 |
| 2007/0203765 A1* | 8/2007 | Schoen | ............ | G06Q 10/02 |
| | | | | 705/6 |
| 2007/0226088 A1* | 9/2007 | Miles | ............... | G06Q 10/08 |
| | | | | 705/28 |
| 2010/0076796 A1 | 3/2010 | Klein et al. | | |

FOREIGN PATENT DOCUMENTS

| | | |
|---|---|---|
| JP | 2008-152686 | 7/2008 |
| WO | 2013132273 A2 | 9/2013 |

OTHER PUBLICATIONS

Extended European Search Report dated Feb. 15, 2017, filed in counterpart European Patent Application No. 16187626.3 (9 pages).
Japanese Office Action filed Jan. 9, 2018 in counterpart Japanese Patent Application No. 2015-189517 (6 pages) (with machine translation).

* cited by examiner

| EVENT NUMBER | CUSTOMER TERMINAL ID | BAGGAGE TERMINAL ID | EVENT DATE AND TIME | EVENT TYPE | PERSON IN CHARGE |
|---|---|---|---|---|---|
| 101 | C099 | D156 | YYYMMDDhhmm | KEEPING | ○○ |
| 102 | C123 | D058 | YYYMMDDhhmm | KEEPING | ○○ |
| 103 | C025 | D333 | YYYMMDDhhmm | RETURNING | △△ |
| 104 | C087 | D027 | YYYMMDDhhmm | RETURNING | ×× |
| 105 | C001 | D014 | YYYMMDDhhmm | KEEPING | ×× |
| ⋮ | ⋮ | ⋮ | ⋮ | ⋮ | ⋮ |

FIG. 4

| EVENT NUMBER | CUSTOMER TERMINAL ID | BAGGAGE TERMINAL ID | EVENT DATE AND TIME | VIDEO TIME | EVENT TYPE | PERSON IN CHARGE |
|---|---|---|---|---|---|---|
| 101 | C099 | D156 | YYYYMMDDhhmm | hhmm | KEEPING | ○○ |
| 102 | C123 | D058 | YYYYMMDDhhmm | hhmm | KEEPING | ○○ |
| 103 | C025 | D333 | YYYYMMDDhhmm | hhmm | RETURNING | △△ |
| 104 | C087 | D027 | YYYYMMDDhhmm | hhmm | RETURNING | ×× |
| 105 | C001 | D014 | YYYYMMDDhhmm | hhmm | KEEPING | ×× |
| ... | ... | ... | ... | ... | ... | ... |

BAGGAGE MANAGEMENT SYSTEM

CROSS-REFERENCE TO RELATED APPLICATION

This application is based upon and claims the benefit of priority from Japanese Patent Application No. 2015-189517, filed Sep. 28, 2015; the entire contents of which are incorporated herein by reference.

FIELD

Embodiments described herein relate generally to a baggage management system.

BACKGROUND

In a baggage storage facility, baggage of a user is kept, and management of the baggage is performed by a person in charge of the baggage storage facility. In such a facility, there may be a problem in that it is difficult to search for a video recording of an event relating to the management of the baggage, such as storing baggage or retrieval of baggage.

DETAILED DESCRIPTION

In order to solve the above described problem, a baggage management system is provided to effectively manage a video corresponding to an event.

A baggage management system according to an embodiment includes a storage unit and a processor. The storage unit stores a baggage terminal identification corresponding to a baggage terminal which is provided with a baggage that is a subject of a baggage management event. The storage unit also stores a clock time of the baggage management event, the clock time being stored in association with the baggage terminal identification. The processor receives a search condition corresponding to the baggage terminal identification. The processor identifies the clock time stored in the storage unit in association with the baggage terminal identification that corresponds to the search condition. The processor identifies a video file of a video recording recorded at the identified clock time. A display unit displays the identified video file.

Hereinafter, an embodiment will be described with reference to drawings.

A baggage management system according to the embodiment stores items (baggage), which are arranged in a storage space such as shelf, for a user. For example, the baggage management system is used for providing a service of storing items of a user in a cloakroom, or the like of a hotel. In addition, the baggage management system may be used for providing a service to sell specific merchandise in a restaurant, or the like to a user.

In addition, the baggage is retrieved from the storage space and returned to the user. For example, the baggage may be luggage, merchandise, an animal, or the like. The baggage is not limited to a specific configuration.

Here, the baggage management system is used in a baggage storage facility, where a service of storing baggage of a user is provided. In addition, the baggage means baggage to be stored for the user.

Figure 1:
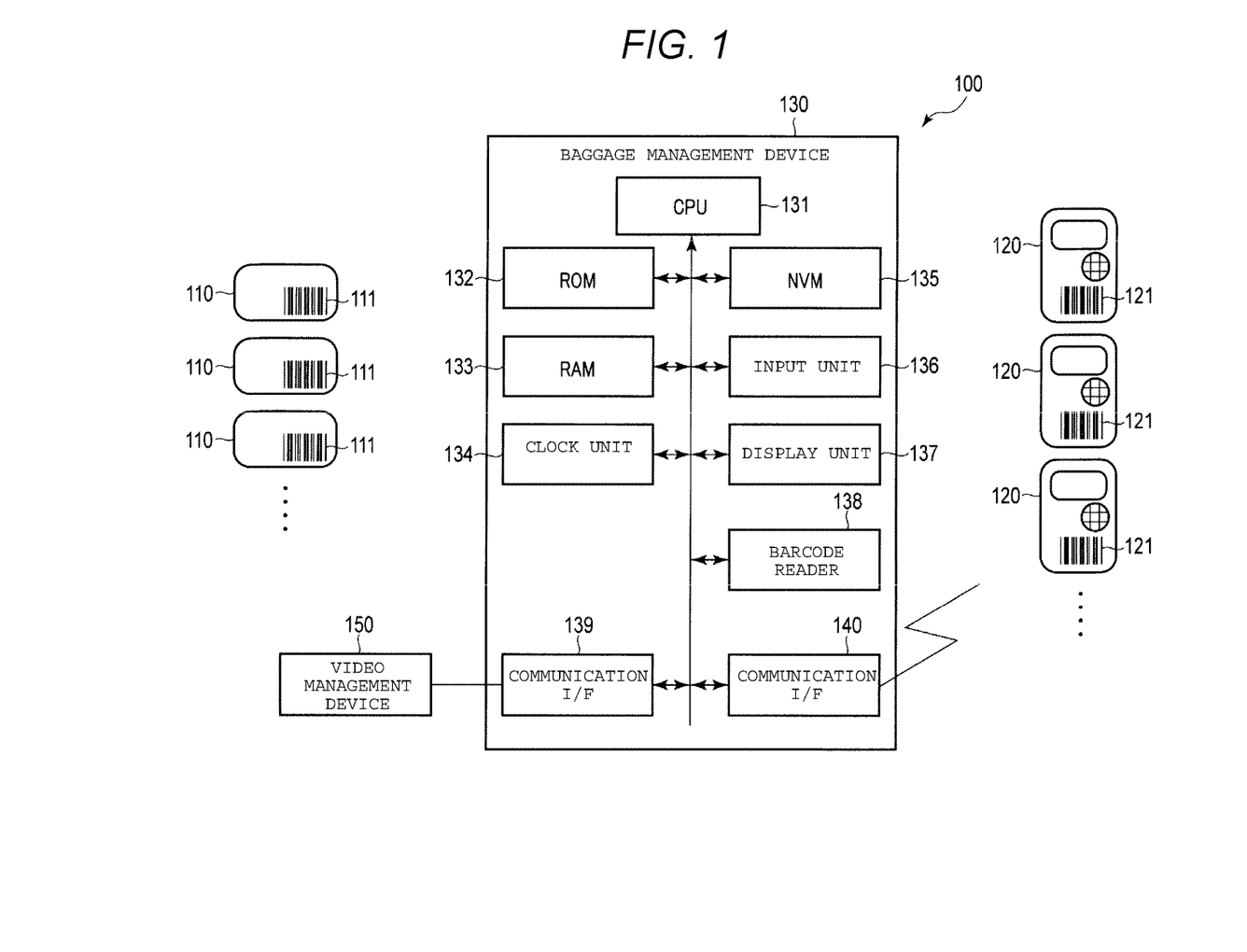
FIG. 1 is a block diagram illustrating an example configuration of a baggage management system according to an embodiment.

FIG. 1 is a block diagram illustrating an example configuration of a baggage management system 100 in the embodiment. The baggage management system 100 includes a plurality of customer terminals 110, a plurality of baggage terminals 120, a baggage management device 130, a video management device 150, and the like.

Multiple customer terminals 110 are provided at a counter of the baggage storage facility. The customer terminals 110 are provided to a user who stores the baggage. The user carries the provided customer terminal 110 while the baggage is stored. The user returns the customer terminal 110 in exchange for the stored baggage when retrieving the stored baggage.

The customer terminal 110 includes a barcode 111, which displays a unique ID (hereinafter, referred to as customer terminal ID) to identify the terminal. Also, the customer terminal 110 can transmit and receive data via near field communication (NFC), or the like, and may transmit the customer terminal ID to an external device via NFC.

Moreover, the customer terminal 110 may transmit a beacon signal for notifying a position thereof.

Multiple baggage terminals 120 are provided at a counter of the baggage storage facility. One baggage terminal 120 is provided with the stored baggage of the user. When the user stores a plurality of items as the baggage, the baggage terminal 120 may be provided with one of the items, that is, the plurality of items may be effectively stored as a single item. The baggage terminal 120 is not necessarily mounted to the baggage, and instead may be arranged at a position where the baggage is stored. In addition, the baggage terminal 120 may be mounted in a shelf, or the like where the baggage is arranged.

When the baggage terminal 120 receives a notification signal instructing an execution of a notification operation from the baggage management device, the terminal may execute the notification operation. For example, the notification signal includes a unique ID (hereinafter, refer to as baggage terminal ID) (baggage terminal information) of the baggage terminal 120. The baggage terminal 120 executes the notification operation in a case in which the baggage terminal ID included in the notification signal is the same as the baggage terminal ID of the baggage terminal 120.

The notification operation notifies a person in charge (who is retrieving baggage) about a position of the baggage terminal 120. The notification operation may include, for example, emitting light from a light source and/or making sound from a sound source. For example, the notification operation may initially perform emitting the light only, and may also perform making sound after a certain time elapses.

As another example, the notification operation may initially perform making sound only, and may also emit light after a certain time elapses. The notification operation may perform at least any one of emission of light and making sound. The notification operation is not limited to a specific configuration.

The baggage terminal 120 receives the notification signal from the baggage management device 130, for example, through a wireless PAN or a wireless LAN.

The baggage terminal 120 may stop the notification operation by, for example, a manual toggling of a switch to off. Also, the baggage terminal 120 may execute the notification operation again after a predetermined time elapses after being stopped. Alternatively, the baggage terminal 120 may not execute the notification operation until resetting after being stopped.

The baggage terminal 120 includes barcode 121 which displays the corresponding baggage terminal ID. Moreover, the baggage terminal 120 may communicate via NFC, or the like, and may transmit the baggage terminal ID to an external device via NFC.

Moreover, the baggage terminal 120 may not execute the notification operation.

The baggage management device 130 includes a central processing unit (CPU) 131, a read only memory (ROM) 132, a random access memory (RAM) 133, a clock unit 134, a nonvolatile memory (NVM) 135, an input unit 136, a display unit 137, a barcode reader 138, a communication interface 139, a communication interface 140, and the like. The baggage management device 130 connects the CPU 131 with the ROM 132, the RAM 133, the clock unit 134, the NVM 135, the input unit 136, the display unit 137, the barcode reader 138, the communication interface 139, and the communication interface 140 through a bus line BL such as an address bus or a data bus.

The CPU 131 controls the entire operations of the baggage management device 130. The CPU 131 may be provided with an internal cache, various interfaces, and the like. The CPU 131 achieves various processes by executing programs kept in an internal memory, the ROM 132, or the NVM 135 in advance.

Moreover, the various functions achieved when a program is executed by the CPU 131 may be achieved by a hardware circuit. In this case, the CPU 131 controls functions executed by the hardware circuit.

The ROM 132 is a non-volatile memory where a program for controlling and control data are stored in advance. The control program and the control data stored in the ROM 132 are provided in advance according to specification of the baggage management device 130. The ROM 132 stores, for example, a program (for example, BIOS) for controlling an integrated circuit of the baggage management device 130.

The RAM 133 is a volatile memory. The RAM 133 stores data, or the like, which is being used by the CPU 131. The RAM 133 stores various application programs based on a command from the CPU 131. In addition, the RAM 133 may store data necessary for executing the application programs, an executed result of the application programs, and the like.

In addition, the RAM 133 includes a work memory WM1 which stores the customer terminal ID, a work memory WM2 which stores the baggage terminal ID, and the like.

The clock unit 134 tracks a system time (date and time) of the baggage management system 100. The clock unit 134 may include an oscillator, or the like therein to track the system time. In addition, the clock unit 134 may obtain the time from an external device.

The NVM 135 is a non-volatile memory which is capable of writing and rewriting data. The NVM 135 is, for example, an electric erasable programmable read-only memory (EEPROM), a hard disc drive (HDD), a solid state drive (SSD), or the like. The NVM 135 stores control programs, applications, and various data depending on an operation of the baggage management device 130. In addition, the NVM 135 stores data generated when the CPU 131 executes various processes.

The NVM 135 includes a baggage management file, described later.

Using the input unit 136, various instructions are input by an operator of the baggage management device 130. The input unit 136 transmits data of the instructions input by the operator to the CPU 131. The input unit 136 is, for example, a keyboard, a ten key number pad, a touch panel, and the like. In the present embodiment, the input unit 136 is a touch panel.

The display unit 137 displays various information by control of the CPU 131. The display unit 137 is, for example, a liquid crystal monitor, or the like.

Here, the display unit 137 is integrally formed with the input unit 136. That is, the display unit 137 displays icons for inputting instructions, and the input unit 136 receives an input of the instructions when an icon is touched.

The barcode reader 138 optically reads the barcode 111 and the barcode 121 which are respectively provided on the customer terminal 110 and the baggage terminal 120. The barcode reader 138 transmits codes read from the barcode 111 and the barcode 121 to the CPU 131.

The communication interface 139 is an interface for communicating with the video management device 150. The communication interface 139 receives data from the video management device 150 and transmits the data to the video management device 150 according to a signal of the CPU 131. The communication interface 139 communicates with the video management device 150 in a wired or wireless manner. The communication interface 139 may be an interface, for example, a wired LAN, USB, a wireless LAN, or a wireless PAN.

The communication interface 140 is an interface for wireless communication with the baggage terminal 120. Based on a signal from the CPU 131, the communication interface 140 sends a signal to the baggage terminal 120 positioned within a region where a wireless communication can be performed. For example, the communication interface 140 transmits the notification signal for executing the notification operation to the baggage terminal 120.

The communication interface 140 wirelessly communicates with the baggage terminal 120 using an antenna. For example, the antenna may be a leaky coaxial cable, or the like, which is laid in a ceiling, or the like, of a storage space where the baggage is stored.

Moreover, the communication interface 140 may communicate with the baggage terminal 120 in a wired manner.

The communication interface 139 and the communication interface 140 may be provided as one communication interface.

The video management device 150 records the storage task and the retrieval task, and manages the recorded video.

Figure 2:
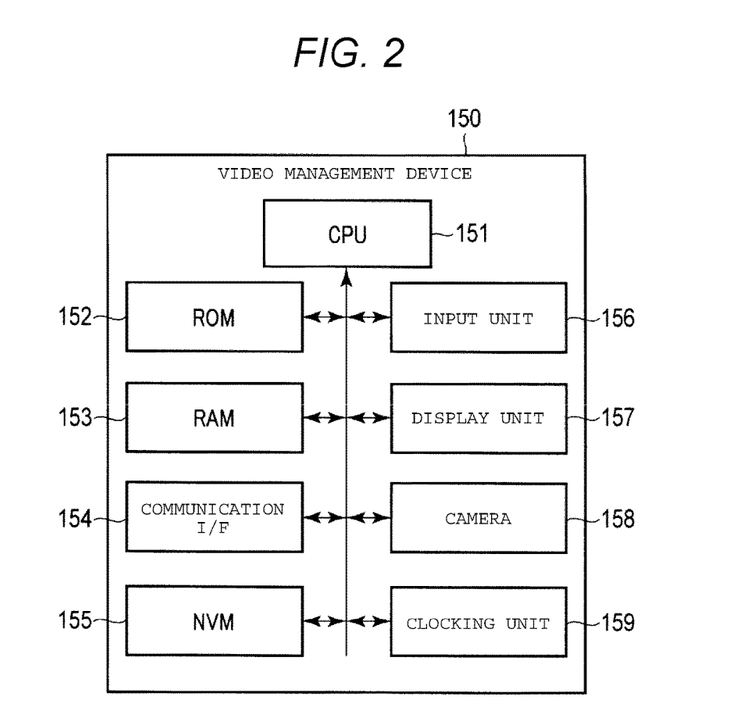
FIG. 2 a block diagram illustrating an example configuration example of a video management device.

FIG. 2 is a block diagram illustrating an example configuration of the video management device 150.

The video management device 150 includes a CPU 151, a ROM 152, a RAM 153, a communication interface 154, a NVM 155, an input unit 156, a display unit 157, a camera 158, a clock unit 159, and the like. The video management device 150 connects the CPU 151, the ROM 152, the RAM 153, the communication interface 154, the NVM 155, the input unit 156, the display unit 157, the camera 158, and the clock unit 159, through the bus line BL such as an address bus or a data bus.

The CPU 151 controls the entire operation of the video management device 150. The CPU 151 may be provided with an internal cache, various interfaces, and the like therein. The CPU 151 achieves various processes by executing programs stored in advance in an internal memory, the ROM 152, or the NVM 155.

Moreover, various functions may be achieved when the CPU 151 executes the programs may be achieved by a hardware circuit. In this case, the CPU 151 controls the functions being executed by the hardware circuit.

The ROM 152 is a non-volatile memory where a program for controlling, control data, or the like is stored. The control program and the control data stored in the ROM 152 may be stored in advance depending on a specification of the video management device 150. The ROM 152 stores, for example, a program (for example, BIOS) for controlling an integrated circuit of the video management device 150, or the like.

The RAM 153 is a volatile memory. The RAM 153 stores data, or the like, which is being processed by the CPU 151. The RAM 153 stores various application programs based on commands from the CPU 151. In addition, the RAM 153 may store data necessary for executing the application programs and the executed result of the application programs.

The communication interface 154 is an interface for communicating with the baggage management device 130. The communication interface 154 receives data from the baggage management device 130 and/or transmits the data to the baggage management device 130 according to a signal of the CPU 151. The communication interface 154 communicates with the baggage management device 130 in a wired or wireless manner. The communication interface 154 may be an interface, for example, a wired LAN, USB, a wireless LAN, a wireless PAN, or the like.

The NVM 155 is a non-volatile memory capable of writing and rewriting data. The NVM 155 is, for example, an EEPROM, an HDD, an SSD, or the like. The NVM 155 stores control programs, applications, and various data depending on an operation use of the video management device 150. In addition, the NVM 155 saves data generated when the CPU 151 executes various processes.

The NVM 155 (storage unit) is provided with the video management file 300, and the like. The video management file 300 will be described later.

Using the input unit 156, various instructions are input by an operator of the video management device 150. The input unit 156 transmits the data of instructions input by the operator to the CPU 151. The input unit 156 is, for example, a keyboard, a ten key number pad, a touch panel, and the like. According to the present embodiment, the input unit 156 is a touch panel.

The display unit 157 displays various information under control of the CPU 151. The display unit 157 is, for example, a liquid crystal monitor, or the like.

Here, the display unit 157 is integrally formed with the input unit 156. That is, the display unit 157 displays icons for inputting instructions, and the input unit 156 receives an input of the instructions when an icon is touched.

The camera 158 records a storage task performed by a person in charge of the baggage storage facility. For example, the camera 158 records a storage task, a retrieving task, or the like as the baggage management business. The storage task is when a person in charge receives baggage from the user and then stores the baggage. The retrieval task is when the person in charge returns the baggage to the user.

For example, the camera 158 is provided to capture video of a work table from the top of the work table of the baggage storage facility. For example, the camera 158 is provided to record receiving the baggage from the user and returning the baggage to the user.

The camera 158 is, for example, a CCD camera.

In addition, the video management device 150 may includes a plurality of the cameras 158.

A position, a structure, or the number of the camera 158 is not limited to a specific configuration.

The clock unit 159 tracks time of video (video time) recorded by the camera 158. The clock unit 159 may track time that elapses since the camera 158 starts recording, as the video time. In addition, the clock unit 159 may track a current time as the video time. The time tracked by the clock unit 159 is not limited to a specific configuration.

The clock unit 159 may track the video time using an oscillator inside thereof, or the like. In addition, the clocking unit 159 may track the video time based on the current time obtained from an external device, or the like.

Figure 3:
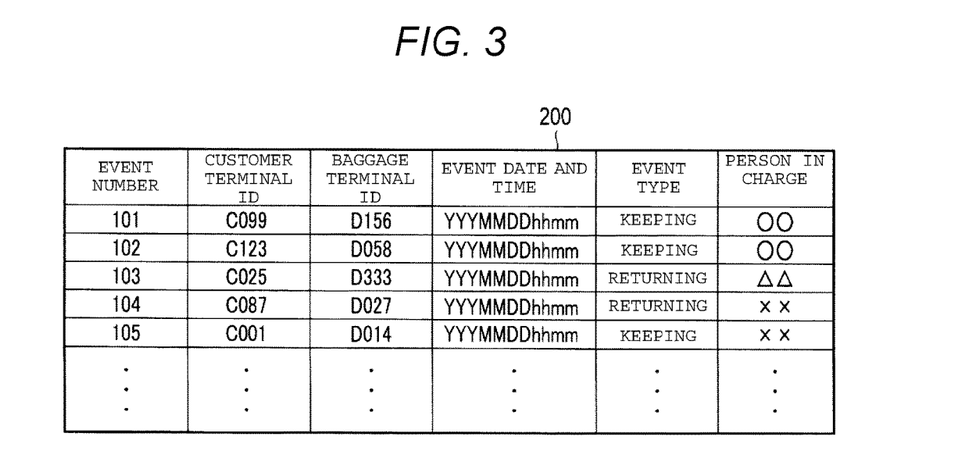
FIG. 3 illustrates an example configuration of a baggage management file.

Next, a baggage management file 200 stored in the NVM 135 of the baggage management device 130 will be described.

FIG. 3 illustrates an example configuration of the baggage management file 200.

As illustrated in FIG. 3, the baggage management file 200 is a data file which stores an event number, a customer terminal ID, a baggage terminal ID, an event date and time, an event type, a person in charge, and the like, in association with each other as one record.

When the baggage is accepted from the user for storage or the baggage is retrieved and returned to the user, the baggage management file 200 stores the event number, the customer terminal ID, the baggage terminal ID, the event date and time, the event type, and a person in charge in association with each other as one record.

The event number is a number for identifying the event. The event is a task relating to the baggage management business. For example, the event is a storage task or a retrieving task.

The customer terminal ID is the customer terminal ID corresponding to the customer terminal 110 used for events. For example, in a case where the event is a storage task, the customer terminal ID is the customer terminal ID of the customer terminal 110 provided to the user. In addition, in a case where the event is a retrieving task, the customer terminal ID is the customer terminal ID of the customer terminal 110 returned by the user.

The baggage terminal ID is the baggage terminal ID corresponding to the baggage terminal 120 used for events. For example, the baggage terminal ID is the baggage terminal ID of the baggage terminal 120 corresponding to the customer terminal 110 indicated by the customer terminal ID. That is, the baggage terminal ID is the baggage terminal ID corresponding to the baggage terminal which is linked with the customer terminal 110 given to the user.

The event date and time indicates a time when the event occurs. The event date and time contains a year, a month, a day, an hour, and a minute. The event date and time is not limited to a specific configuration.

The event type indicates contents of the event. For example, the event type indicates whether the event is the storage task or the retrieval task. "Storage" indicates that the event is the storage task. "Retrieval" indicates that the event is the retrieval task.

Moreover, the event number may indicate whether the event is the storage task or the retrieval task. For example, when the event number starts with "0", the event may be the storage task, and when the event number starts with "1", the event may be the retrieval task.

The person in charge indicates a person in charge of the event.

Moreover, the NVM 135 may store the baggage management file 200 for each storage task and retrieval task. Also, the NVM 135 may store the baggage management file 200 for each person in charge. In addition, the NVM 135 may store the baggage management file 200 for each predetermined period.

A configuration of the baggage management file 200 is not limited to a specific configuration.

The baggage management file 200 may be stored in the RAM 133.

Figure 4:
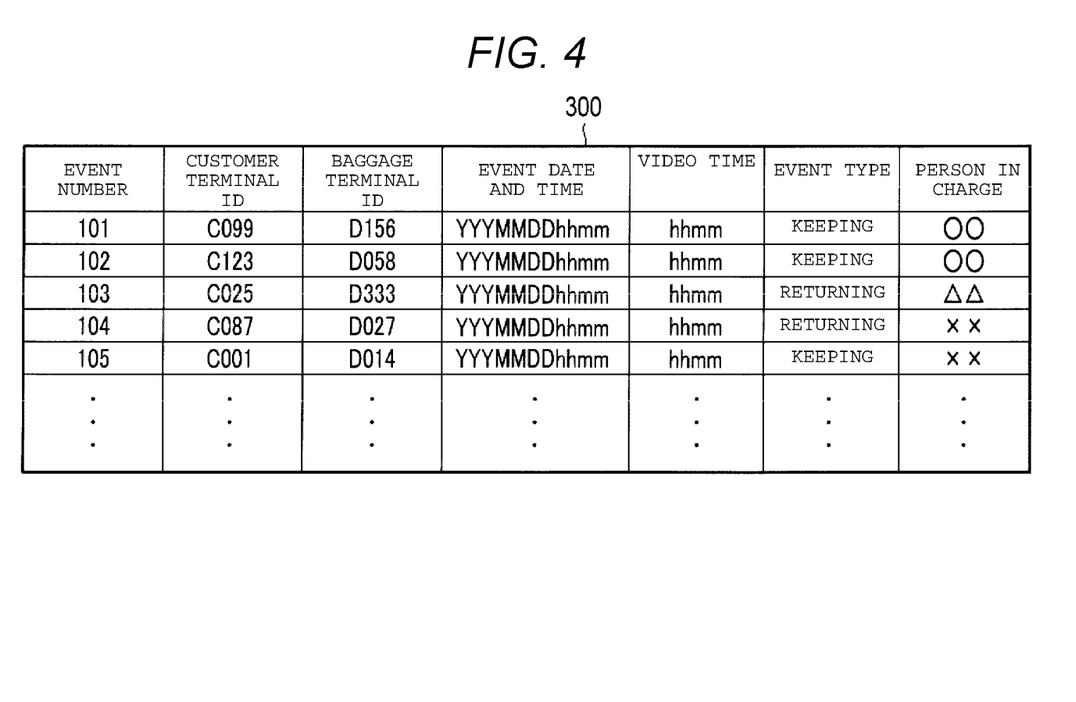
FIG. 4 illustrates an example configuration of a video management file.

Next, the video management file 300 stored in the NVM 155 of the video management device 150 will be described.

The video management file 300 is a data file which stores an event number, a customer terminal ID, a baggage terminal ID, an event date and time, a video time, an event type, a person in charge, and the like, in association with each other as one record.

The event number, the customer terminal ID, the baggage terminal ID, the event date and time, the event type, and the person in charge are same as those of the baggage management file 200, and thus their description are omitted.

The video time is a time when an event, as indicated by the event number, is recorded in a video captured by the camera 158. That is, the video time is a time when an event (for example, storage task or retrieval task) is recorded. Here, the video time includes an hour and minute. The video time may include a date.

Further, in a case where the video management device 150 stores a video file by dividing the file into a plurality of files, the video management file 300 may include information indicating the video file.

In addition, when there are multiple cameras 158, the video management file 300 may include an identification of the camera 158.

Moreover, the NVM 155 may store the video management file 300 for each storage task and retrieval task. In addition, the NVM 155 may store the video management file 300 for each person in charge. In addition, the NVM 155 may store the video management file 300 for each predetermined period.

A configuration of the video management file 300 is not limited to a specific configuration.

Next, functions performed by the CPU 131 of the baggage management device 130 will be described.

The CPU 131 performs a function for adding a record in the baggage management file 200.

That is, the CPU 131 obtains the customer terminal ID and the baggage terminal ID when the baggage is stored. In addition, at the same time, the CPU 131 sets an event number and obtains the event date and time and the person in charge. The CPU 131 may obtain information indicating a person in charge who operates the baggage management device 130 in advance. In addition, the CPU 131 may receive input of the information indicating the person in charge when the event occurs.

The CPU 131 adds an event number, a customer terminal ID, a baggage terminal ID, an event date and time, an event type, and a person in charge to the baggage management file 200 as one record. Here, the "event type" is "Storage".

In addition, the CPU 131 obtains the customer terminal ID and the baggage terminal ID when baggage is to be retrieved. In addition, at the same time, the CPU 131 sets the event number and obtains the event date and time. The CPU 131 adds the event number, the customer terminal ID, the baggage terminal ID, the event date and time, the event type and the person in charge to the baggage management file 200 as one record. Here, the "event type" is "Retrieval". In this case, the CPU 131 may obtain either the customer terminal ID or the baggage terminal ID, and search the entire baggage management file for a record that includes the obtained customer terminal ID or baggage terminal ID.

Figure 5:
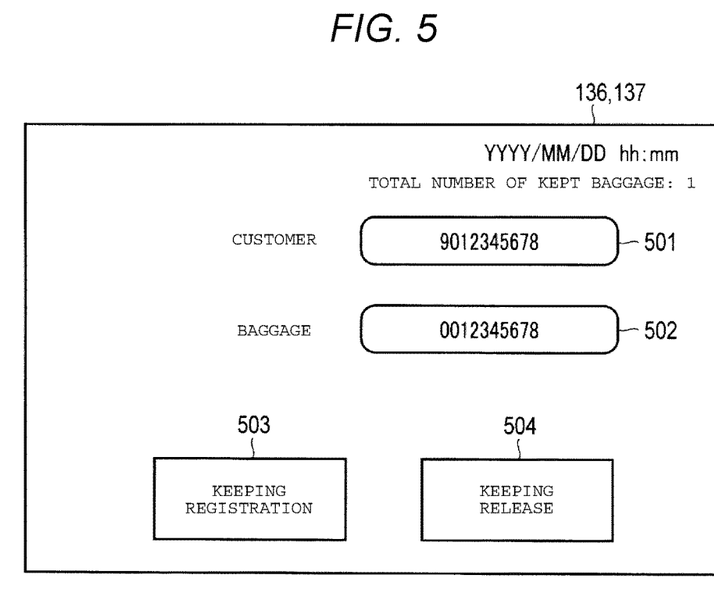
FIG. 5 illustrates an example display screen displayed by a baggage management device.

FIG. 5 is an example ID confirmation screen displayed on the display unit 137.

The ID confirmation screen illustrated in FIG. 5 is a screen displayed when the CPU 131 obtains the customer terminal ID and the baggage terminal ID.

As illustrated in FIG. 5, the ID confirmation screen includes a customer terminal ID display area 501, a baggage terminal ID display area 502, a storage registration icon 503, a storage release icon 504, or the like.

The customer terminal ID display area 501 displays the customer terminal ID obtained by the CPU 131.

The baggage terminal ID display area 502 displays the baggage terminal ID obtained by the CPU 131.

The storage registration icon 503 is an icon for instructing to store the baggage (that is, initiate the storage task) using the customer terminal ID and the baggage terminal ID obtained by the CPU 131.

The storage release icon 504 is an icon for instructing to retrieve the baggage (that is, initiate the retrieval task) using the customer terminal ID and the baggage terminal ID obtained by the CPU 131.

Moreover, the ID confirmation screen may be selectively displayed during the baggage management operations. In addition, when the CPU 131 obtains the customer terminal ID or the baggage terminal ID, the CPU may display the customer terminal ID or the baggage terminal ID on the customer terminal ID display area 501 or the baggage terminal ID display area 502 as needed.

Figure 6:
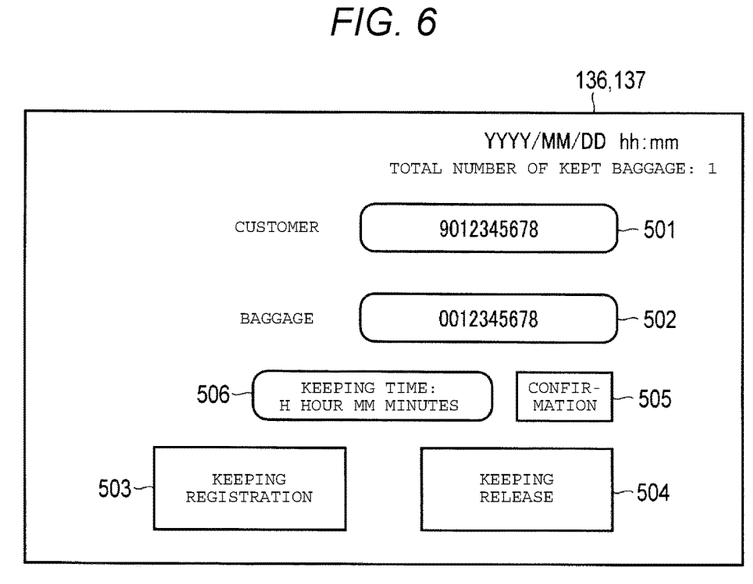
FIG. 6 illustrates another example display screen displayed by the baggage management device.

FIG. 6 is an ID confirmation screen displayed when baggage is returned to the customer.

The ID confirmation screen illustrated in FIG. 6 includes a confirmation icon 505, a time display area 506, and the like in addition to the icons of the ID confirmation screen of FIG. 5.

The confirmation icon 505 confirms a release of storage (that is, confirm the retrieval task).

The time display area 506 displays a time for which the baggage is kept.

Moreover, a configuration of the ID confirmation screen is not limited to a specific configuration.

In addition, the CPU 131 performs a function of transmitting instruction data with a record to the video management file 300 of the video management device 150. The instruction data includes the event number, the customer terminal ID, the baggage terminal ID, the event date and time, the event type, the person in charge, and the like. That is, the instruction data includes contents of the record of the baggage management file 200.

The CPU 131 performs a function of transmitting the instruction data to the video management device 150, when a person in charge stores baggage or retrieves baggage (that is, when a record is added to the baggage management file 200) (transmission processing unit). Moreover, the CPU 131 may transmit the instruction data corresponding to an event which occurs during an interval in predetermined intervals, to the video management device 150. In addition, the CPU 131 may transmit the instruction data corresponding to the event to the video management device 150, after a predetermined number of events occur.

Moreover, the CPU 131 may transmit a part of the event number, the customer terminal ID, the baggage terminal ID, the event date and time, the event type, and the person in charge to the video management device 150 as the instruction data. For example, the CPU 131 may transmit the customer terminal ID or the baggage terminal ID to the video management device 150 as the instruction data. The content of the instruction data is not limited to a specific configuration.

Next, functions performed by the CPU 151 of the video management device 150 will be described.

The CPU 151 performs a function of recording baggage management operations performed near a counter of a baggage storage facility, through control of the camera 158 (recording unit). The CPU 151 continuously records during an operation time of the baggage management business, including timing other than an event such as a storage task or a retrieval task. For example, the CPU 151 may store video data, which is recorded at a predetermined interval (for example, 30 minutes), as a file. In addition, the CPU 151 may attach a video time to the video file in every predetermined interval (for example, 1 second). For example, the CPU 151 stores the video file in the NVM 155, or the like.

The CPU 151 performs a function of adding a record to the video management file 300 based on the instruction data received from the baggage management device 130.

When the CPU 151 receives the instruction data, the CPU generates the video time corresponding to an event indicated by the instruction data. For example, the CPU 151 may set the video time at the time of receiving the instruction data as a video time corresponding to the event. In addition, the CPU 151 may generate the video time based on the event date and time included in the instruction data.

The CPU 151 adds the generated video time, the event number, the customer terminal ID, the baggage terminal ID, the event date and time, the event type, and the person in charge, which are included in the instruction data, to the video management file 300 as one record.

Alternatively, the CPU 151 may add some, but not all, of the obtained video time, the event number, the customer terminal ID, the baggage terminal ID, the event date and time, the event type, and the person in charge, which are included in the instruction data, to the video management file 300 as one record. For example, the CPU 151 may add the obtained video time, any one of the customer terminal ID and the baggage terminal ID included in the instruction data, to the video management file 300, as one record.

In addition, when there are multiple cameras 158, the CPU 151 may add the identification of the camera 158 to the record. In this case, the CPU 151 may add a plurality of records having identification of different cameras with respect to one event to the video management file 300.

In addition, the CPU 151 performs a function of reproducing a video (event video) corresponding to an event. That is, the CPU 151 reproduces an event video in which all the details of the event are recorded.

For example, the CPU 151 receives a search condition for searching for an event video (search condition obtaining unit). The CPU 151 may receive the search condition from the input unit 156. The CPU 151 may also receive the search condition through the communication interface 154. In addition, the CPU 151 may receive the search condition from an external device other than the baggage management device 130. The search condition is, for example, an event number, a customer terminal ID, a baggage terminal ID, an event date and time, an event type, or a person in charge.

For example, the CPU 151 searches for the video time corresponding to an event using the event number, the customer terminal ID, the baggage terminal ID, the event date and time, the event type, or a person in charge as a search condition from the video management file 300 (searching unit).

The CPU 151 sets an event video based on a video time (setting unit). For example, the CPU 151 may set a video corresponding to the video time to a predetermined time as an event video. In addition, the CPU 151 may set a video corresponding a video time to a time before a predetermined time as an event video. A configuration of the event video is not limited to a specific configuration.

The CPU 151 reproduces the set event video (reproducing unit). For example, the CPU 151 displays the event video on the display unit 157.

Moreover, when multiple video times corresponding to the search condition are retrieved, the CPU 151 may make the event video corresponding to each video time be selected by a person in charge. In this case, the CPU 151 reproduces the selected event video.

Figure 7:
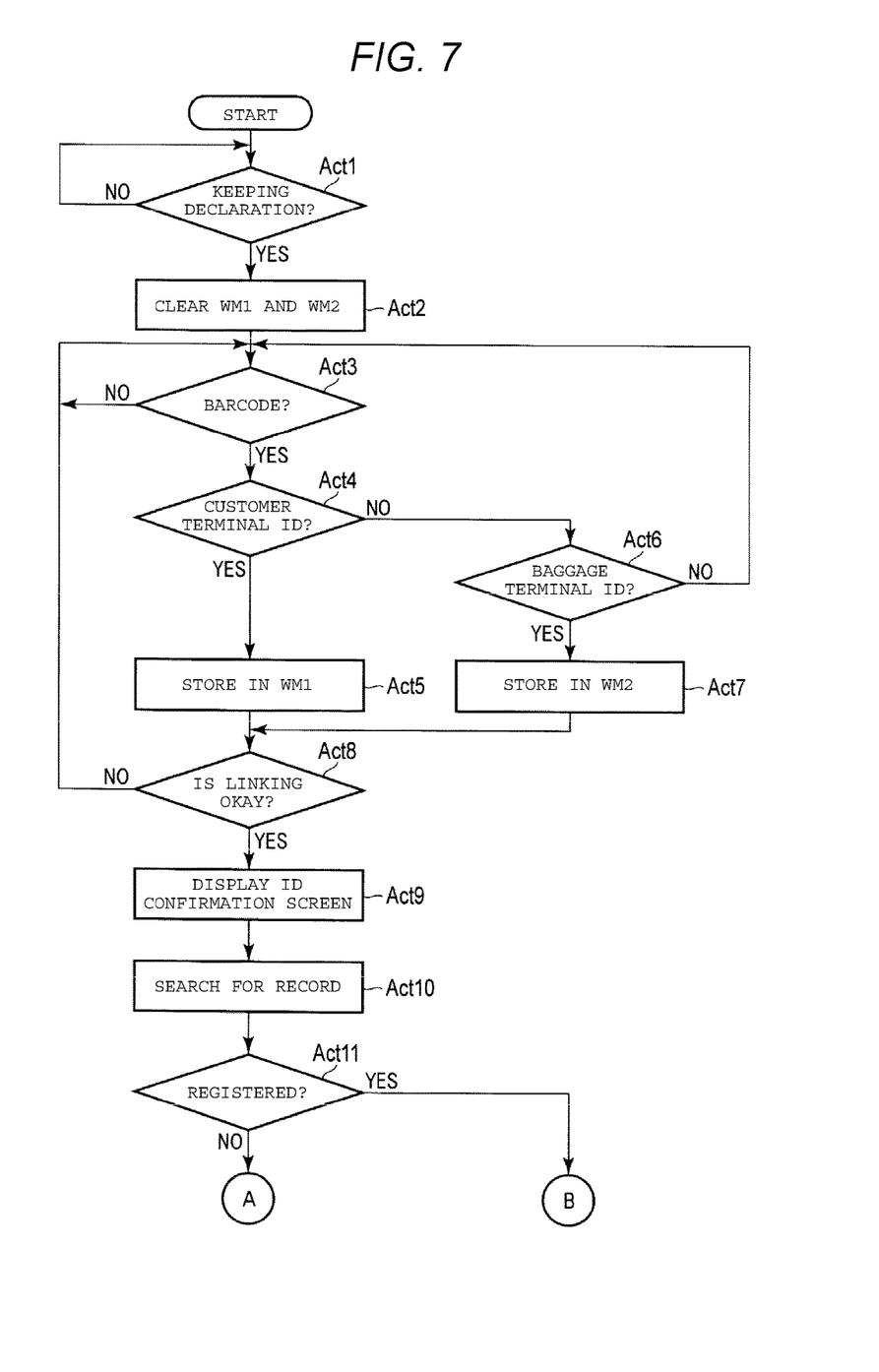
FIGS. 7 and 8 are flow charts illustrating an example sequence of operations performed in the baggage management device.
Figure 8:
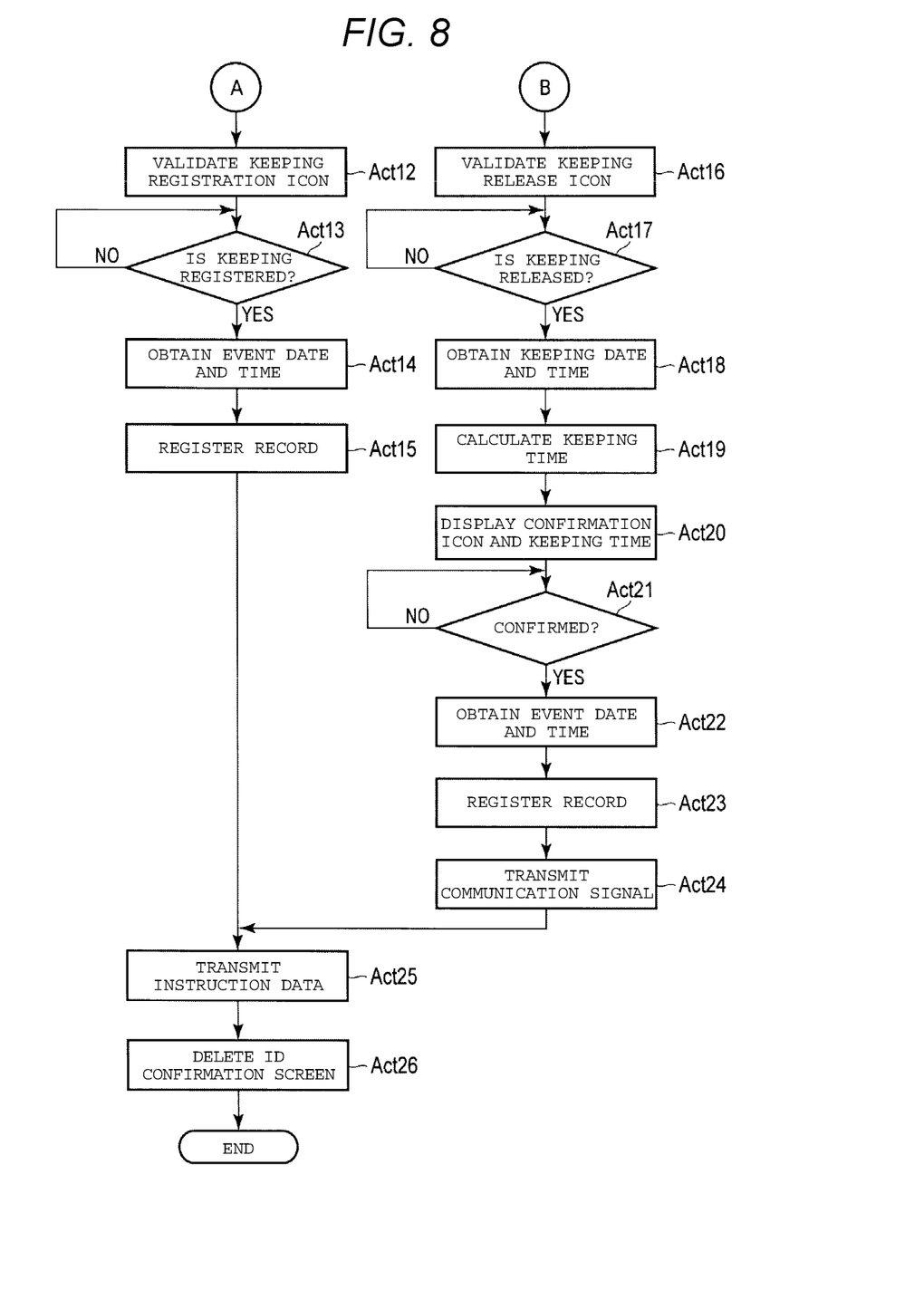

Next, an operation example of the baggage management device 130 will be described.

FIGS. 7 and 8 are flow charts illustrating an example sequence of operations of the baggage management business of the baggage management device 130.

First, the CPU 131 determines whether or not a storage registration, which indicates a start of a baggage management operation by a person in charge, is input (Act 1). For example, the CPU 131 determines whether or not a storage registration icon displayed in the display unit 137 is touched.

When the CPU determines that the person in charge does not input the storage registration (NO in Act 1), the CPU 131 returns to Act 1.

When the CPU determines that the person in charge inputs the storage registration (YES in Act 1), the CPU 131 clears the work memories WM1 and WM2 (Act 2).

The CPU 131 determines whether or not barcode data is input (Act 3). For example, the CPU 131 determines whether or not the barcode is read by the barcode reader 138.

When the CPU determines that the barcode data is input (YES in Act 3), the CPU 131 determines whether or not the input barcode data is a customer terminal ID (Act 4). For example, the CPU 131 recognizes a classification flag, or the like included in the barcode data, and determines whether or not the barcode data is the customer terminal ID.

When the CPU determines that the input barcode data is the customer terminal ID (YES in Act 4), the CPU 131 stores the input barcode data in the work memory WM1 as the customer terminal ID (Act 5).

When the CPU determines that the input barcode data is not the customer terminal ID (NO in Act 4), the CPU 131 determines whether or not the input barcode data is the baggage terminal ID (Act 6). For example, the CPU 131 recognizes the classification flag, or the like included in the barcode data, and determines whether or not the barcode data is the baggage terminal ID.

When the CPU determines that the input barcode data is the baggage terminal ID (YES in Act 6), the CPU 131 stores the input barcode data in the work memory WM2 as the baggage terminal ID (Act 7).

When the CPU determines that the input barcode data is not the baggage terminal ID (NO in Act 6), the CPU 131 returns to Act 3.

When the input barcode data is stored in the work memory WM1 as the customer terminal ID (Act 5), or the input barcode data is stored in the work memory WM2 as the baggage terminal ID (Act 6), the CPU 131 determines whether or not the customer terminal ID is linked with the baggage terminal ID (Act 8). When the customer terminal ID and the baggage terminal ID are respectively stored in the work memories WM1 and WM2, the CPU 131 determines that these IDs are linked with each other. When only one of these IDs is stored, the CPU 131 determines that these IDs are not linked with each other.

When the CPU determines that these IDs are not linked with each other (NO in Act 8), the CPU 131 returns to Act 3.

When the CPU determines that these IDs are linked with each other (YES in Act 8), the CPU 131 displays the ID confirmation screen in the display unit 137 (Act 9). For example, the CPU 131 displays the ID confirmation screen illustrated in FIG. 5. Also, the storage registration icon 503 and the storage release icon 504 in the ID confirmation screen are disabled.

When the ID confirmation screen is displayed, the CPU 131 searches for a record including the customer terminal ID and the baggage terminal ID, which are respectively stored in the work memories WM1 and WM2 in the baggage management file 200 (Act 10). That is, the CPU 131 determines whether or not the record including the customer terminal ID and the baggage terminal ID is registered in the baggage management file 200.

When it is determined that the record including the customer terminal ID and the baggage terminal ID is not registered in the baggage management file 200 (NO in Act 11), the CPU 131 enables the storage registration icon 503 (Act 12). That is, the CPU 131 accepts a touch operation with respect to the storage registration icon 503.

When the storage registration icon 503 is enabled, the CPU 131 determines whether or not the storage registration icon 503 is touched (Act 13). When it is determined that the storage registration icon 503 is not touched (NO in Act 13), the CPU 131 returns to Act 13.

When it is determined that the storage registration icon 503 is touched (YES in Act 13), the CPU 131 obtains date and time data clocked by the clock unit 134 as an event date and time when the user receives the baggage (Act 14).

When the event date and time is obtained, the CPU 131 additionally registers the event number, the customer terminal ID of the work memory WM1, the baggage terminal ID of the work memory WM2, the event date and time, the event type, and the person in charge to the baggage management file 200 as one record (Act 15). Here, the event type is "Storage".

When it is determined that the record including the customer terminal ID and the baggage terminal ID is registered in the baggage management file 200 (YES in Act 11), the CPU 131 enables the storage release icon 504 (Act 16). That is, the CPU 131 accepts a touch operation with respect to the storage release icon 504.

When the storage release icon 504 is enabled, the CPU 131 determines whether or not the storage release icon 504 is touched (Act 17). When it is determined that the storage release icon 504 is not touched (NO in Act 17), the CPU 131 returns to Act 17.

When it is determined that the storage release icon 504 is touched (YES in Act 17), the CPU 131 obtains a storage date and time from the record corresponding to the customer terminal ID and the baggage terminal ID (Act 18).

When the storage date and time is obtained, the CPU 131 calculates a storage time for which the baggage is kept (Act 19). For example, the CPU 131 calculates a storage time by subtracting the storage date and time from a current date and time.

When the storage time is calculated, the CPU 131 displays the confirmation icon 505 and the time display unit 506 including the storage time (Act 20). For example, the CPU 131 displays the ID confirmation screen illustrated in FIG. 6.

When the confirmation icon 505 and the time display unit 506 are displayed, the CPU 131 determines whether or not the confirmation icon 505 is touched (Act 21). When it is determined that the confirmation icon 505 is not touched (NO in Act 21), the CPU 131 returns to Act 21.

When it is determined that the confirmation icon 505 is touched (YES in Act 21), time date clocked by the clock unit 134 is obtained as an event date and time of which the baggage is returned to the user (Act 22).

When the event date and time is obtained, the CPU 131 additionally adds the event number, the customer terminal ID of the work memory WM1, the baggage terminal ID of the work memory WM2, the event date and time, the event type, the person in charge to the baggage management file 200 as one record (Act 23). Here, the event type is "Retrieval".

When the record is registered, the CPU 131 transmits a notification signal to the baggage terminal 120 through the communication interface 140 (Act 24). Moreover, the CPU 131 may transmit the notification signal after receiving a predetermined instruction from the person in charge of the baggage storage facility.

When a record is additionally registered in the baggage management file 200 (Act 15), or the notification signal is transmitted (Act 24), the CPU 131 transmits instruction data, which includes the event number, the customer terminal ID, the baggage terminal ID, the event date and time, the event type, the person in charge, and the like, to the video management device 150 through the communication interface 139 (Act 25).

When the instruction data is transmitted, the CPU 131 deletes the ID confirmation screen (Act 26). When the ID confirmation screen is deleted, the CPU 131 terminates an operation.

The person in charge who touches the storage registration icon 503 applies the baggage terminal 120 that includes the barcode read by the barcode reader 138, to the baggage provided from the user for storage. For example, the person in charge attaches the baggage terminal 120 to the baggage. The person in charge puts the baggage to which the baggage terminal 120 is attached in the storage space. In addition, the person in charge gives the customer terminal 110 that includes the barcode read by the barcode reader 138 to the user who stores the baggage.

In addition, the person in charge touching the storage release icon 504 collects the customer terminal 110 from the user. In addition, the person in charge takes out the baggage to which the baggage terminal 120 is provided from the storage space and returns the baggage to the user. The person in charge identifies the baggage to which the baggage terminal 120 is provided due to the baggage terminal 120 performing the notification operation.

Figure 9:
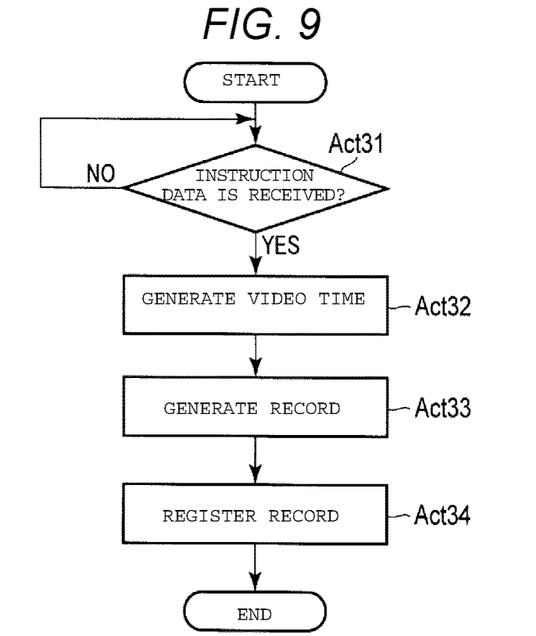
FIG. 9 is a flow chart illustrating an example sequence of operations of the video management device.

Next, an operation example of the video management device 150 will be described.

First, an operation example will be described in which the video management device 150 adds a record to the video management file 300.

FIG. 9 is a flow chart illustrating an example sequence of operations in which the video management device 150 adds a record to the video management file 300.

First, the CPU 151 of the video management device 150 determines whether or not the instruction data is received from the baggage management device 130 through the communication interface 154 (Act 31).

When it is determined that the instruction data is not received (NO in Act 31), the CPU 151 returns to Act 31.

When it is determined that the instruction data is received (YES in Act 31) (reception processing unit), the CPU 151 generates a video time based on the instruction data (Act 32).

When the video time is generated, the CPU 151 generates a record being added to the video management file 300 based on the generated video time and instruction data (Act 33). When the record is generated, the CPU 151 additionally registers the generated record to the video management file 300 (Act 34).

When the record is registered to the video management file 300, the CPU 151 terminates the operation.

Moreover, the CPU 151 may register a record corresponding to each instruction data to the video management file 300, after receiving predetermined numbers of the instruction data. In addition, the CPU 151 receives the instruction data at a predetermined period, and may register the record corresponding to the instruction data received within the period to the video management file 300.

Figure 10:
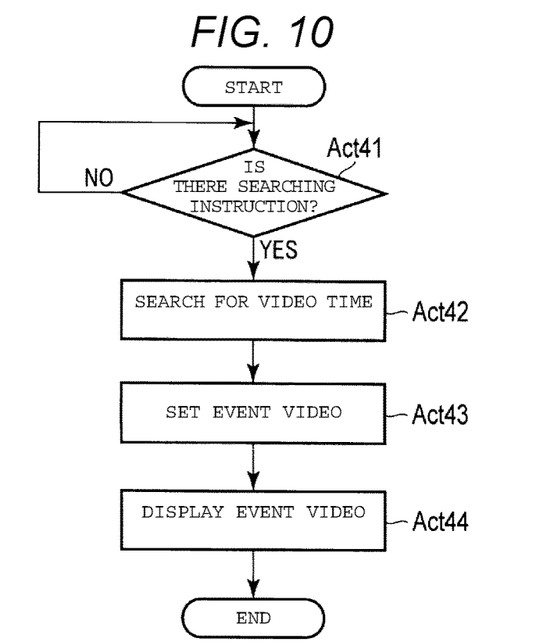
FIG. 10 is a flow chart illustrating another example sequence of operations of the video management device.

Next, an operation example of which the video management device 150 reproduces an event video will be described.

FIG. 10 is a flow chart illustrating an example sequence of operations in which the video management device 150 reproduces an event video.

First, the CPU 151 of the video management device 150 determines whether or not a searching instruction containing a search condition for searching for the event video is accepted through the input unit 156 (Act 41). For example, the searching instruction may include the event number, the customer terminal ID, the baggage terminal ID, the event date and time, the event type, the person in charge, or the like as the search condition for searching for the event video. Moreover, the CPU 151 may accept the searching instruction by communicating with an external device. In addition, the customer terminal ID or the baggage terminal ID as the searching condition may be obtained using the barcode reader, or the like, which is not illustrated, and the CPU 151 may accept the searching instruction.

When it is determined that the searching instruction is not accepted (NO in Act 41), the CPU 151 returns to Act 41.

When it is determined that the searching instruction is accepted (YES of Act 41), the CPU 151 searches for a video time from the video management file 300, using the event number, the customer terminal ID, the baggage terminal ID, the event date and time, the event type, the person in charge, or the like, which are included in the searching instruction as the search condition (Act 42).

When the video time is searched for, the CPU 151 sets the event video based on the video time that is searched for (Act 43).

When the event video is set, the CPU 151 reproduces the event video on the display unit 157 (Act 44).

When the event video is reproduced, the CPU 151 terminates an operation.

Also, the CPU 151 may transmit the event video to an external device. For example, the CPU 151 may accept the searching instruction from the baggage management device 130, and transmit the event video corresponding to the searching instruction to the baggage management device 130.

The baggage management system configured as described above is capable of storing a video time when an event such as the storage task and the retrieval task of the baggage has occurred. As a result, the baggage management system is capable of easily searching for the event video in which all the details of an event is recorded using the customer terminal ID of the customer terminal, the baggage terminal ID of the baggage terminal, or the like as a condition. Therefore, the baggage management system easily provides the event video to the person in charge or the user. For this reason, the baggage management system is capable of providing the event video as an evidence with respect to a claim from the user, such as damaging of the baggage, the baggage not being returned, or the baggage being improperly returned (e.g., to the wrong person). As described above, the baggage management system can effectively manage the video corresponding to the event.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A baggage management system comprising:
a reader configured to acquire first identification information of a baggage terminal associated with a baggage deposited by a user;
a video camera positioned and configured to record a video file of an area where the baggage is deposited by the user;
a first storage device configured to store the video file recorded by the video camera;
a timer configured to output a time of each of a plurality of baggage handling events including the baggage being deposited by the user;
a second storage device configured to store the first identification information in association with the time corresponding to the baggage being deposited by the user output by the timer;
a display device configured to selectively display the video file; and
a processor configured to:
receive a second identification information in connection with a search request,
determine whether the second identification information corresponds with the first identification information stored in the second storage device,
when the second identification information is determined to correspond with the first identification information, identify the time stored in association with the first identification information,
extract an event video having a predetermined length from the video file stored in the first storage device, the event video including a portion of the video file that was recorded at the identified time, and
control the display device to display the extracted event video.

2. The system according to claim 1, wherein
the time corresponding to the baggage being deposited by the user is defined as a first time,
a time when the baggage is returned to the user, as another one of the plurality of baggage handling events, is defined as a second time,
the baggage handling event in which the baggage is deposited is defined as a first class,
the baggage handling event in which the baggage is returned is defined as a second class,
the second storage device stores a plurality of records, each corresponding to one baggage handling event, each record including the first identification information, the first or second time, and the first or second class, in association with each other; and
the processor is further configured to:
  determine whether a third identification information acquired via the reader corresponds to the first identification information included in one of the plurality of records when the baggage is returned to the user; and
  when the third identification information is determined to correspond to the first identification information, add the first identification information, the second time and the second class as another one of the plurality of records.

3. The system according to claim 1, wherein
the reader is further configured to acquire a third identification information corresponding to a portable terminal of the user;
the second storage device is further configured to store the first identification information, the time, and the third identification information respectively in association with each other, and
the processor is further configured to:
  determine whether the received second identification information corresponds to one of the first identification information and the third identification information stored in the second storage device,
  when the second identification information is determined to correspond with the third identification information, identify the time stored in association with the third identification information,
  extract an event video having a predetermined length from the video file stored in the first storage device, the event video including a portion of the video file that was recorded at the identified time, and
  control the display device to display the extracted event video.

4. The system according to claim 3, wherein
the time corresponding to the baggage being deposited by the user is defined as a first time,
a time when the baggage is returned to the user, as another one of the plurality of baggage handling events, is defined as a second time,
the baggage handling event in which the baggage is deposited is defined as a first class,
the baggage handling event in which the baggage is returned is defined as a second class,
the second storage device stores a plurality of records, each corresponding to one baggage handling event, each record including the first identification information, the third identification information, the first or second time, and the first or second class, in association with each other; and
the processor is further configured to:
  determine whether a fourth identification information acquired via the reader corresponds to the third identification information included in one of the plurality of records when the baggage is returned to the user; and
  when the fourth identification information is determined to correspond to the third identification information, add the first identification information, the third identification information, the second time and the second class as another one of the plurality of records.

5. A baggage management method comprising the steps of:
acquiring first identification information of a baggage terminal associated with a baggage deposited by a user;
recording a video file of an area where the baggage is deposited by the user;
storing the video file;
outputting a time of each of a plurality of baggage handling events including the baggage being deposited by the user;
storing the first identification information in association with the output time corresponding to the baggage being deposited by the user;
receiving a second identification information in connection with a search request;
determining whether the second identification information corresponds with the stored first identification information;
when the second identification information is determined to correspond with the first identification information, identifying the time stored in association with the first identification information,
extracting an event video having a predetermined length from the stored video file, the event video including a portion of the video file that was recorded at the identified time; and
displaying the extracted event video on a display device.

6. The method according to claim 5, wherein
the time corresponding to the baggage being deposited by the user is defined as a first time,
a time when the baggage is returned to the user, as another one of the plurality of baggage handling events, is defined as a second time,
the baggage handling event in which the baggage is deposited is defined as a first class,
the baggage handling event in which the baggage is returned is defined as a second class,
a plurality of records are stored, each corresponding to one baggage handling event, each record including the first identification information, the first or second time, and the first or second class, in association with each other, the method further comprising:
determining whether a third identification information acquired via a reader corresponds to the first identification information included in one of the plurality of records when the baggage is returned to the user; and
when the third identification information is determined to correspond to the first identification information, adding the first identification information, the second time and the second class as another one of the stored plurality of records.

7. The method according to claim 5, further comprising:
acquiring a third identification information corresponding to a portable terminal of the user;

storing the first identification information, the time, and the third identification information respectively in association with each other;

determining whether the received second identification information corresponds to one of the stored first and third identification information;

when the second identification information is determined to correspond with the third identification information, identifying the time stored in association with the third identification information;

extracting an event video having a predetermined length from the video file stored in the first storage device, the event video including a portion of the video file that was recorded at the identified time; and controlling the display device to display the extracted event video.

8. The method according to claim 7, wherein
the time corresponding to the baggage being deposited by the user is defined as a first time,
a time when the baggage is returned to the user, as another one of the plurality of baggage handling events, is defined as a second time,
the baggage handling event in which the baggage is deposited is defined as a first class,
the baggage handling event in which the baggage is returned is defined as a second class, and
a plurality of records are stored, each corresponding to one baggage handling event, each record including the first identification information, the third identification information, the first or second time, and the first or second class, in association with each other, the method further comprising:
determining whether a fourth identification information acquired via the reader corresponds to the third identification information included in one of the plurality of records when the baggage is returned to the user; and
when the fourth identification information is determined to correspond to the third identification information, adding the first identification information, the third identification information, the second time and the second class as another one of the plurality of records.

9. A baggage management system comprising:
a storage unit configured to store:
a first identification information corresponding to a baggage terminal associated with a baggage deposited by a user, and
a time of the baggage being deposited by the user, the time being stored in association with the first identification information;
and
a processor configured to:
receive a second identification information in connection with a search request,
determine whether the second identification information corresponds with the first identification information stored in the storage device,
when the second identification information is determined to correspond with the first identification information, identify the time stored in association with the first identification information,
extract, from a video file recorded of an area where the baggage is deposited by the user, an event video having a predetermined length and including a portion of the video file that was recorded at the identified time, and
control a display device to display the extracted event video.

10. The system according to claim 9, wherein
the time corresponding to the baggage being deposited by the user is defined as a first time,
a time when the baggage is returned to the user, as another one of the plurality of baggage handling events, is defined as a second time,
the baggage handling event in which the baggage is deposited is defined as a first class,
the baggage handling event in which the baggage is returned is defined as a second class,
the second storage device stores a plurality of records, each corresponding to one baggage handling event, each record including the first identification information, the first or second time, and the first or second class, in association with each other;
and
the processor is further configured to:
determine whether a third identification information acquired via the reader corresponds to the first identification information included in one of the plurality of records when the baggage is returned to the user; and
when the third identification information is determined to correspond to the first identification information, add the first identification information, the second time and the second class as another one of the plurality of records.

11. The system according to claim 9, wherein
the reader is further configured to acquire a third identification information corresponding to a portable terminal of the user;
the second storage device is further configured to store the first identification information, the time, and the third identification information respectively in association with each other, and
the processor is further configured to:
determine whether the received second identification information corresponds to one of the first identification information and the third identification information stored in the second storage device,
when the second identification information is determined to correspond with the third identification information, identify the time stored in association with the third identification information,
extract an event video having a predetermined length from the video file stored in the first storage device, the event video including a portion of the video file that was recorded at the identified time, and
control the display device to display the extracted event video.

12. The system according to claim 11, wherein
the time corresponding to the baggage being deposited by the user is defined as a first time,
a time when the baggage is returned to the user, as another one of the plurality of baggage handling events, is defined as a second time,
the baggage handling event in which the baggage is deposited is defined as a first class,
the baggage handling event in which the baggage is returned is defined as a second class,
the second storage device stores a plurality of records, each corresponding to one baggage handling event, each record including the first identification information, the third identification information, the first or second time, and the first or second class, in association with each other; and the processor is further configured to:
- determine whether a fourth identification information acquired via the reader corresponds to the third identification information included in one of the plurality of records when the baggage is returned to the user; and
- when the fourth identification information is determined to correspond to the third identification information, add the first identification information, the third identification information, the second time and the second class as another one of the plurality of records.

* * * * *